United States Patent [19]

Nomiya et al.

[11] 3,889,135

[45] June 10, 1975

[54] BOOTSTRAP CIRCUIT EMPLOYING INSULATED GATE TRANSISTORS

[75] Inventors: Kosei Nomiya; Yoshikazu Hatsukano; Kazuo Minorikawa, all of Tokyo, Japan

[73] Assignee: Hitachi, Ltd., Japan

[22] Filed: June 28, 1973

[21] Appl. No.: 374,815

[30] Foreign Application Priority Data

July 21, 1972 Japan .............................. 47-72528

[52] U.S. Cl. ................. 307/270; 307/246; 307/251

[51] Int. Cl....H03k 17/06: H03k 17/10; H03k 17/60

[58] Field of Search ........... 307/205, 214, 246, 251, 307/279, 270; 328/176

[56] References Cited

UNITED STATES PATENTS

| | | | |
|---|---|---|---|
| 3,480,796 | 11/1969 | Polkinghorn et al. | 307/205 X |
| 3,573,507 | 4/1971 | Eng | 307/279 |
| 3,646,369 | 2/1972 | Fujimoto | 307/279 X |
| 3,743,862 | 7/1973 | Bell | 307/205 X |

OTHER PUBLICATIONS

Reynolds et al., "Metal–Oxide–Semiconductor (MOS) Integrated Circuits," Post. Off. Elect. Engrs. J. (G.B.) Vol. 63, Pt. 2, 7/1970; pp. 105–112.

Saffir, "Getting More Speed from MOS," Electronics (pub.); 2/17/1969; pp. 106–109.

Lohman, "Applications of MOS FETS in Microelectronics," SCP and Solid State Technology (pub.); 3/1966; pp. 23–29.

Askin et al., "FET Device Parameters Compensation Circuit," IBM Tech. Discl. Bull., Vol. 14, No. 7, pp. 2088–2089, 12/1971.

*Primary Examiner*—Michael J. Lynch
*Assistant Examiner*—L. N. Anagnos
*Attorney, Agent, or Firm*—Craig & Antonelli

[57] ABSTRACT

A bootstrap circuit employing insulated gate transistors comprises a load element connected at one end to a voltage source, an insulated gate transistor connected between the other end of the load element and ground, a load element connected between the voltage source and a gate electrode of an insulated gate transistor at the following stage, and a capacitor connected between the juncture of the first-mentioned load and the first-mentioned transistor. A clock pulse is applied to a gate electrode of the first-mentioned transistor, so that the output potential of a push-pull buffer circuit, for example, which includes the bootstrap circuit may be held high without being severely subjected to the condition that the output impedance of the clock pulse source be low.

3 Claims, 5 Drawing Figures

BOOTSTRAP CIRCUIT EMPLOYING INSULATED GATE TRANSISTORS

BACKGROUND OF THE INVENTION

1. Field of the Invention

The present invention relates to a bootstrap circuit employing insulated gate transistors (hereinbelow termed MOS transistors). More particularly, it relates to a bootstrap circuit which is used in order to raise the output potential of a digital output circuit.

2. Description of the Prior Art

In recent years, a variety of buffers employing MOS transistors have been developed with rapid progress in the development of MOS transistors. As a requisite of the buffer circuit the output impedance must be low. As a logic output circuit employing MOS transistors satisfying such a requisite, there is often adopted the type in which, as shown in FIG. 1, a push-pull buffer circuit is constructed by the use of four MOS transistors $T_1 - T_4$.

With a buffer circuit having such a construction, however, the source potentials of the MOS transistors $T_2$ and $T_3$ become much lower in comparison with a supply voltage $V_{GG}$ on account of the substrate effect. More specifically, in the circuit shown in FIG. 1, the source voltage of the MOS transistor $T_2$ is $(V_{GG} - V_{th})$($V_{th}$: the threshold voltage of the transistor $T_2$). The source voltage of the MOS transistor $T_3$, i.e., the potential at output terminal OUT is an extremely small value obtained by further subtracting the threshold voltage $V_{th}$ of the MOS transistor $T_3$ from the source voltage $(V_{GG} - V_{th})$ of the MOS transistor $T_2$.

In order to solve such a problem, a push-pull buffer circuit has been proposed in which, as illustrated in FIG. 2, an MOS transistor $T_5$ is connected as a load resistance between the gate electrode of the MOS transistor $T_2$ and the voltage source $V_{GG}$ in the circuit shown in FIG. 1, while one terminal of a capacitor C is connected to the gate electrode of the MOS transistor $T_2$, a clock pulse CP being applied to the other terminal of the capacitor C. With the circuit thus constructed, the gate voltage of the transistor $T_2$ is boosted up from the terminal voltage of the capacitor C to a voltage with the voltage of the clock pulse CP added thereto. For this reason, substantially no voltage drop arises between the drain and source of the MOS transistor $T_2$, and the source voltage of the MOS transistor $T_2$ becomes substantially equal to the drain potential thereof. The gate potential of the third transistor $T_3$, to which the source potential of the MOS transistor $T_2$ is supplied, is also raised therewith. In consequence, the source potential of the MOS transistor $T_3$ rises similarly to the above, and a large output voltage can be provided from the output terminal OUT.

Since, however, the clock pulse is directly applied to the capacitor C of comparatively large capacitance, the circuit according to such construction is subject to the condition that the output impedance of the clock pulse source must be made low. This becomes a serious problem especially where the clock pulse source is constructed of MOS transistors.

SUMMARY OF THE INVENTION

It is, accordingly, an object of the present invention to provide a bootstrap circuit in which the output potential of a buffer circuit or the like composed of insulated gate field-effect transistors is prevented from being lowered.

Another object of the present invention is to provide a bootstrap circuit in which, even for a long period of the input signal, the output potential of a buffer circuit employing insulated gate field-effect transistors is prevented from being lowered.

Another object of the present invention is to provide a bootstrap circuit which lightens the condition on the output impedance of the generating source of clock pulses to be supplied to the bootstrap circuit employing insulated gate transistors.

Still another object of the present invention is to provide a bootstrap circuit whose occupying area is small in an integrated semiconductor circuit.

PREFERRED EMBODIMENTS OF THE INVENTION

The bootstrap circuit employing insulated gate field effect transistors according to the present invention will be described in detail hereunder with reference to the accompanying drawings.

Figure 2:
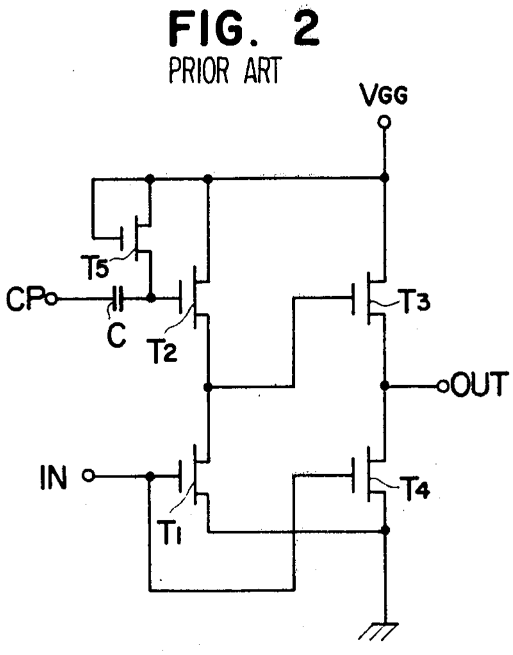
FIG. 2 PRIOR ART
Figure 3:
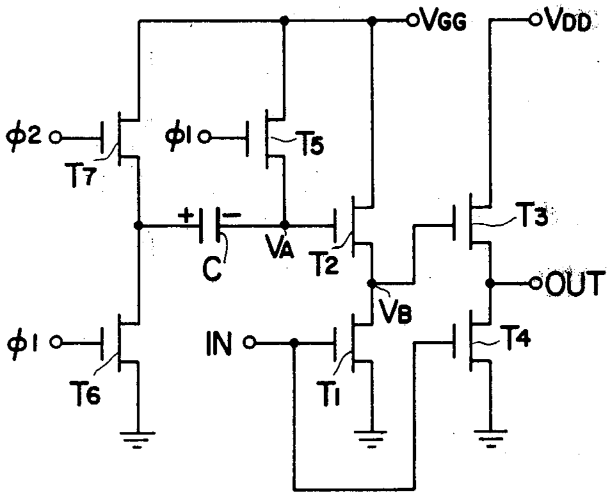
FIG. 3 is a circuit diagram which shows an embodiment of a push-pull buffer circuit which includes a bootstrap circuit employing insulated gate transistors according to the present invention.

FIG. 3 shows an embodiment of a push-pull buffer circuit which includes a bootstrap circuit employing insulated gate transistors according to the present invention. In the figure, the same parts as in FIG. 2 are affixed with the same symbols. Referring to FIG. 3, $T_6$ indicates an MOS transistor which is connected between the other terminal of the capacitor C and ground and whose gate electrode is applied with a clock pulse $\phi_1$. Connected in series with the transistor $T_6$ is an MOS transistor $T_7$, the gate electrode of which is applied with a clock pulse $\phi_2$ differing in phase from the clock pulse $\phi_1$. The MOS transistor $T_5$ is connected between the voltage source $V_{GG}$ and the gate electrode of the transistor $T_2$, and has the clock pulse $\phi_1$ applied to its gate electrode.

Figure 1:
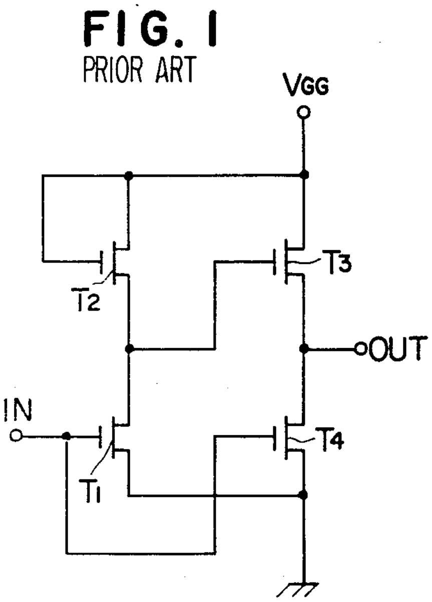
FIG. 1 PRIOR ART
FIGS. 1 and 2 are circuit diagrams each of which shows an example of a push-pull buffer circuit employing MOS transistors as has hitherto been generally adopted.
Figure 4:
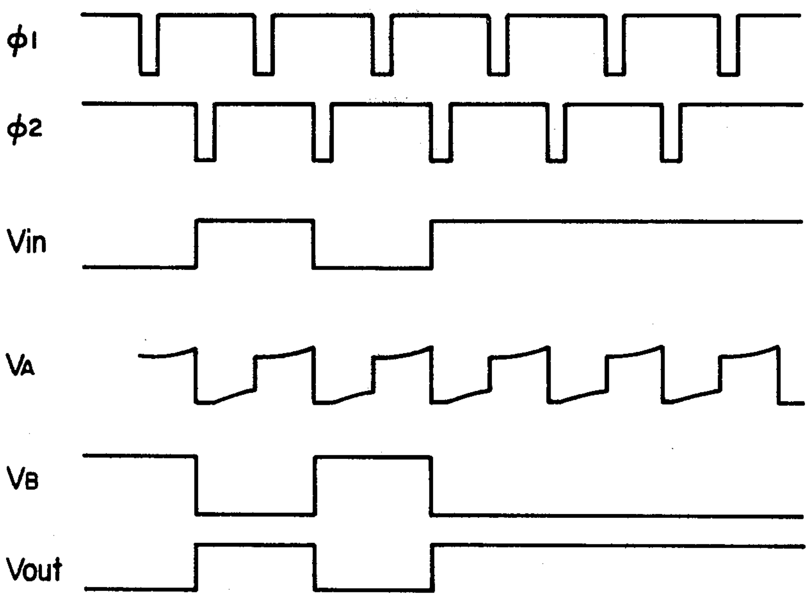
FIG. 4 is a wave-form diagram of operations at various parts of the circuit illustrated in FIG. 3.

The operation of the circuit thus constructed will now be described. In the following embodiments, description will be made with respect to circuits using P-channel enhancement type MOSFETs, and with a negative potential-$V_{GG}$ applied thereto. Since the MOS transistors $T_5$ and $T_6$ turn "on" at the period of the clock pulses $\phi_1$, the capacitor C is charged at this period. When an input signal $V_{in}$, synchronized as shown in FIG. 4 with the clock pulse $\phi_2$, is subsequently supplied to an input terminal IN, the MOS transistor $T_7$ is rendered conductive by the clock pulse $\phi_2$, and the gate electrode of the MOS transistor $T_2$ is applied with a voltage which, as illustrated at $V_A$ in FIG. 4, results from the addition of the voltage of the power supply $V_{GG}$ to the charging voltage of the capacitor C (where the voltage value of the clock pulse $\phi_2 \geqq V_{GG} + V_{th}$ ). As a result, the gate voltage of the MOS transistor $T_2$ becomes sufficiently higher than the drain potential thereof. Therefore, when the MOS transistor $T_1$ is held non-conductive by the input signal $V_{in}$, the source potential $V_B$ of the MOS transistor $T_2$ is as shown in FIG. 4 and is approximately equal to the supply voltage $V_{GG}$. Accordingly, the output potential of the push-pull buffer circuit becomes a value lower than the supply potential $V_{GG}$ by the threshold potential $V_{th}$ of the MOS transistor $T_3$. Since the gate voltage of the MOS transistor $T_2$ is sufficiently higher than the drain voltage thereof, the value of the output potential is improved by the threshold voltage $V_{th}$ in comparison with the output potential of the prior-art push-pull circuit shown in FIG. 1.

Figure 5:
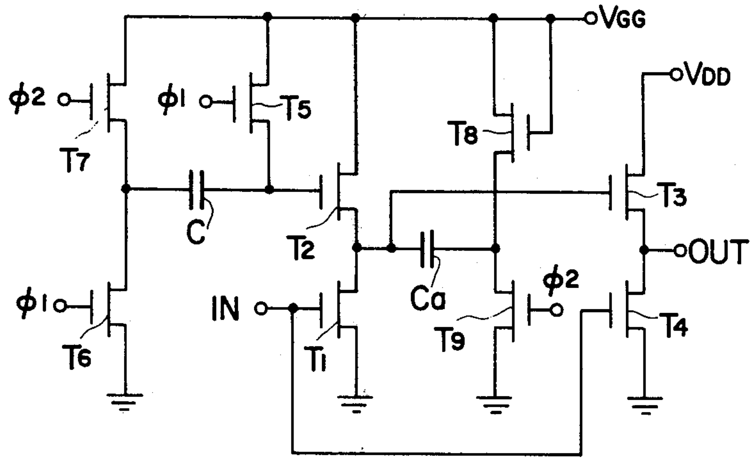
FIG. 5 is a circuit diagram which shows another embodiment of the push-pull buffer circuit employing a bootstrap circuit according to the present invention.

FIG. 5 shows another embodiment of the push-pull buffer circuit which includes a bootstrap circuit employing insulated gate transistors according to the present invention. In the figure, the same parts as in FIG. 3 are affixed with the same symbols. Referring to FIG. 5, $T_8$ designates a MOS transistor functioning as a load. Indicated at $T_9$ is a MOS transistor whose drain electrode is connected through the MOS transistor $T_8$ to the power supply, and whose source electrode is connected to the earth. To the gate electrode thereof, the clock pulse $\phi_2$ is applied. A capacitor $C_a$ is connected between the source electrode of the MOS transistor $T_2$ and the drain electrode of the MOS transistor $T_9$.

With the circuit thus constructed, a point of difference from the embodiment in FIG. 3 resides in that at a timing synchronized with the clock pulse $\phi_2$ (when the transistor $T_9$ becomes conductive), the capacitor $C_a$ is charged, and that when the MOS transistor $T_9$ becomes non-conductive by the clock pulse $\phi_2$, the gate voltage of the transistor $T_3$ is raised through a path consisting of the power supply $V_{GG}$ — MOS transistor $T_8$ — capacitor $C_a$ — gate electrode of the MOS transistor $T_3$. In conformity with such construction, the voltage impressed on the gate electrode of the MOS transistor $T_3$ becomes a value resulting by adding the voltage $(V_{GG} - V_{th})$ to the charging voltage of the capacitor $C_a$. The absolute value of the gate potential is larger than the absolute value of the negative drain voltage $V_{DD}$ of the transistor $T_3$. As a result, a potential substantially equal to the voltage $V_{GG}$ is obtained as the output voltage $V_{out}$.

Although, in connection with the embodiments, description has been made of the case where the MOS transistor $T_5$ receiving the clock pulse $\phi_1$ as its input is connected between the gate electrode of the MOS transistor $T_2$ and the power supply, the present invention is not restricted thereto. Even when the transistor $T_5$ is substituted by a resistance or by a diode only or a series connection consisting of a diode and a resistance in which the cathode of the diode is connected to $V_{GG}$, a similar effect is achieved. Although, in the embodiments, the MOS transistor $T_7$ is connected between one terminal of the capacitor C and the power source $V_{GG}$, it may be replaced with a resistance. In addition, even when the supply voltage $V_{GG}$ is applied to the gate electrodes of the MOS transistors $T_5$ and $T_7$, a similar effect is acquired.

The bootstrap circuit including the transistor $T_5 - T_7$ and the capacitor C can be applied, not only to the push-pull circuit, but also to other circuits (such as a driver circuit and a pulse generator circuit) in the same manner. Also in this case, the output potential of the insulated gate field-effect transistor connected to the bootstrap circuit can be made higher.

As described above, in accordance with the circuit of the present invention, it is possible to feed to the gate electrode of the MOS transistor $T_2$ or $T_3$ the electric potential with the supply voltage $V_{GG}$ added to the charging voltage of the capacitor C or $C_a$, namely, the electric potential higher than the drain potential of the transistor $T_2$ or $T_3$, and hence, the output voltage can be prevented from lowering. Besides, in accordance with the present invention, the clock pulse $\phi_1$ or $\phi_2$ is impressed on the gate electrode of the transistor $T_6$, $T_7$ or $T_9$ having a capacitance (input capacitance) sufficiently smaller than that of the capacitor C, in other words, the charging action of the capacitor C and the boost action (the voltage raising action) are indirectly effected by the clock pulse $\phi_1$ or $\phi_2$, so that the restriction on the output impedance of the clock pulse generator source can be relaxed in comparison with that of the prior art. Moreover, in accordance with the present invention, the capacitors are boosted continually periodically by the clock pulses, so that the lowering of the output potential can be prevented even for an input signal of long period. Furthermore, in accordance with the bootstrap circuits shown in FIGS. 3 and 5, the transistors $T_6$ and $T_7$ are not simultaneously rendered conductive, and they are alternately rendered conductive. The occupying area of the MOS transistor $T_6$ can therefore be made extremely small without considering the resistance ratio of the MOS transistors during their conduction time.

What we claim is:

1. A bootstrap circuit employing insulated gate field effect transistors comprising:
- a first insulated gate field effect transistor having a source, a drain, and a gate electrode;
- first means for coupling the drain electrode of said first transistor to a first power source;
- a second insulated gate field effect transistor having a source, a drain, and a gate electrode;
- a first capacitor connected between the drain electrode of said second transistor and the gate electrode of said first transistor;
- second means for coupling the source electrode of said second transistor to a source of reference potential;
- third means for coupling a first clock pulse to the gate electrode of said second transistor;
- a first impedance coupled between said first means and the drain electrode of said second transistor;
- a second impedance coupled between said first means and the gate electrode of said first transistor;
- a third insulated gate field effect transistor having a source, a drain and a gate electrode, the drain and source electrodes of which being respectively connected to the source electrode of said first insulated gate field effect transistor and said source of reference potential;
- an inverter means including a fourth and a fifth insulated gate field effect transistor connected in series between a second power source and said source of reference potential, the gate electrode of said fourth insulated gate field effect transistor being connected to the source electrode of said first insulated gate field effect transistor, and the gate electrodes of said third and fifth insulated gate field effect transistors being connected together to an input signal terminal;

an output means for deriving an output from said inverter means connected to the source electrode of said fourth insulating gate field effect transistor; and further including a sixth insulated gate field effect transistor having a source, a drain and a gate electrode, the source electrode of which is connected to said second means, a second capacitor connected between the source electrode of said first transistor and the drain electrode of said sixth transistor, a third impedance connected between said first means and the drain electrode of said sixth transistor, and fourth means for coupling a second clock pulse, shifted in time relative to said first clock pulse, to the gate electrode of said sixth transistor.

2. A bootstrap circuit according to claim 1, wherein said second impedance comprises a seventh insulated gate field effect transistor, the source electrode of which is connected to the gate electrode of said first transistor, the drain electrode of which is connected to said first means, and the gate electrode of which is connected to said third means.

3. A bootstrap circuit according to claim 2, wherein said first impedance comprises a eighth insulated gate field effect transistor, the source electrode of which is connected to the drain electrode of said second transistor, the drain electrode of which is connected to said first means, and the gate electrode of which is connected to said fourth means.

* * * * *